(12) United States Patent
Scherer et al.

(10) Patent No.: US 9,413,829 B2
(45) Date of Patent: Aug. 9, 2016

(54) METHOD FOR EFFICIENT INITIALIZATION OF A TELECOMMUNICATIONS NETWORK AND TELECOMMUNICATIONS NETWORK

(75) Inventors: Christoph Scherer, Bensheim (DE); Holger Ebling, Buettelborn/Worfelden (DE)

(73) Assignee: DEUTSCHE TELEKOM AG, Bonn (DE)

( * ) Notice: Subject to any disclaimer, the term of this patent is extended or adjusted under 35 U.S.C. 154(b) by 432 days.

(21) Appl. No.: 13/805,675

(22) PCT Filed: Jun. 21, 2011

(86) PCT No.: PCT/EP2011/003057
§ 371 (c)(1),
(2), (4) Date: Mar. 7, 2013

(87) PCT Pub. No.: WO2011/160812
PCT Pub. Date: Dec. 29, 2011

(65) Prior Publication Data
US 2013/0198396 A1 Aug. 1, 2013

Related U.S. Application Data

(60) Provisional application No. 61/356,775, filed on Jun. 21, 2010.

(30) Foreign Application Priority Data

Jun. 21, 2010 (EP) .................................... 10006412

(51) Int. Cl.
*G06F 15/16* (2006.01)
*H04L 29/08* (2006.01)
(Continued)

(52) U.S. Cl.
CPC .......... *H04L 67/141* (2013.01); *H04L 41/0806* (2013.01); *H04L 41/0869* (2013.01); *H04L 29/1216* (2013.01); *H04L 41/5064* (2013.01); *H04L 61/157* (2013.01)

(58) Field of Classification Search
USPC .................................................. 709/222, 227
See application file for complete search history.

(56) References Cited

U.S. PATENT DOCUMENTS

| 7,127,049 B2 | 10/2006 | Godse et al. |
| 7,277,935 B2 | 10/2007 | Sato |

(Continued)

FOREIGN PATENT DOCUMENTS

| DE | 102007039516 A1 | 2/2009 |
| JP | 2003032277 A | 1/2003 |
| WO | WO 2007016449 A1 | 2/2007 |

OTHER PUBLICATIONS

European Patent Office, International Search Report in International Patent Application No. PCT/EP2011/003050 (Oct. 19, 2011).

(Continued)

*Primary Examiner* — Jason Recek
(74) *Attorney, Agent, or Firm* — Leydig, Voit & Mayer, Ltd.

(57) ABSTRACT

A method for efficient initialization of a telecommunications network includes: establishing a physical communication channel between an access node of the telecommunications network and a configuration device; providing, by the telecommunications network, via an Internet Protocol Edge node, a public or private Internet Protocol address to the configuration device for use by the configuration device to communicate with the Internet Protocol Edge node of the telecommunications network; and assigning, by the telecommunications network, a configuration and installation functionality level to the public or private Internet Protocol address.

9 Claims, 3 Drawing Sheets

(51) Int. Cl.
*H04L 12/24* (2006.01)
*H04L 29/12* (2006.01)

(56) References Cited

U.S. PATENT DOCUMENTS

| | | | | |
|---|---|---|---|---|
| 2009/0031008 | A1* | 1/2009 | Elliott | H04L 61/1517 709/220 |
| 2009/0063689 | A1 | 3/2009 | Camille et al. | |
| 2009/0157674 | A1* | 6/2009 | Curry | 707/6 |
| 2010/0146063 | A1* | 6/2010 | Lidin et al. | 709/206 |
| 2010/0202441 | A1 | 8/2010 | Haag et al. | |
| 2011/0016202 | A1* | 1/2011 | Ye et al. | 709/222 |

OTHER PUBLICATIONS

European Patent Office, Extended European Search Report in European Patent Application No. 10006412.0 (Dec. 21, 2010).

Telecommunications and Internet converged Services and Protocols for Advanced Networking (TISPAN); NGN Functional Architecture; Network Attachment Sub-System (NASS), ETSI Standard, Mar. 1, 2010 European Telecommunications Standards Institute (ETSI), Sophia-Antipolis ; France, vol. TISPAN 2, Nr:V3.4.1, pp. 1-52.

"$3^{rd}$ Generation Partnership Project; Technical Specification Group Services and System Aspects; 3G security; Access security for IP-based services (release 10)" 3GPP Standard; 3GPP TS 33.303, $3^{rd}$ Generation Partnership Project, Sophia-Antipolis Cedex, France, No. V10.0.0, Jun. 16, 2010, pp. 1-114.

Wadwha et al., "Protocol for Access Node Control Mechanism in Broadband Networks; draft-ietf-ancp-protocol-09.txt", Protocol for Access Node Control Mechanism in Broadband Networks, Internet Society (ISOC) 4, Geneva, Switzerland, No. 9, Feb. 26, 2010, pp. 1-58.

Garcia, Yolanda, "DSL fernkonfiguriert" Dec. 5, 2007, pp. 1-14.

* cited by examiner

METHOD FOR EFFICIENT INITIALIZATION OF A TELECOMMUNICATIONS NETWORK AND TELECOMMUNICATIONS NETWORK

CROSS-REFERENCE TO RELATED APPLICATIONS

This application is a U.S. National Phase application under 35 U.S.C. §371 of International Application No. PCT/EP2011/003057, filed on Jun. 21, 2011, and claims benefit to U.S. Provisional Application No. 61/356,775, filed on Jun. 21, 2010, and to European Patent Application No. EP 10006412.0, filed on Jun. 21, 2010. The International Application was published in English on Dec. 29, 2011 as WO 2011/160812 A1 under PCT Article 21(2).

FIELD

The present invention relates to a method for efficient initialization of a telecommunication network and to a telecommunications network.

BACKGROUND

From U.S. Pat. No. 7,127,049, a system enhancing automation of activating network service between a customer modem and a central office modem over a digital subscriber line link is known. In the system according to this prior art, the central office modem couples the customer modem to a network for providing the network service, the system comprising a polling system coupled with the central office modems.

Furthermore, TS 33.203 of the third Generation Partnership Project (3GPP), Access security for IP-based services (Release 10), 16 Jun. 2010 discloses a method for establishing a connection between an access node of a telecommunications network and a User Equipment.

Such known systems have a number of drawbacks. For example, due to the polling system defining a certain time period during which no network access is possible for the customer modem. Furthermore, the known system relays on the provisioning of a session assigned Internet Protocol address which cannot be used permanently and therefore necessitates the reconnection of the connection between the customer modem and the communications network (by possibly another Internet Protocol address and thus possibly a disconnection step and/or the initiation of new session and/or a reboot operation of the customers equipment.

Furthermore, according to the prior art, in order to establish the Internet Protocol connection between, on the one hand, the Internet Protocol Edge node and, on the other hand, the User Equipment like a customer modem, a CPE (Customer Premises Equipment) or a configuration device, it is always necessary to use—as an authentication information—an information that is used or distributed in an untrusted environment. For example, CPE units are pre-configured in a user-specific manner and distributed to a plurality of customers or the customer hast to configure the CPE with credentials he got from the operator of the telecommunications network. Such pre-configuration information is not inherently secure or trusted because, due to the steps occurring prior to the establishment of an Internet Protocol session according to the prior art, the telecommunications network operator necessarily needs to distribute such credentials or pre-configuration or other (previously trusted) information in an untrusted environment or to an untrusted environment (e.g. customers household).

These limitations have the effect that the connection between the CPE on the one hand and the telecommunications network on the other hand is comparably time consuming or inherently insecure or at least involving an enormous logistical effort, e.g. for the distribution and/or updating of user credentials and/or pre-configured CPE equipment. Furthermore, the user has to type in credentials to access the network. There is no plug and play solution to access the network and services provided to the network connectivity.

Furthermore, German patent publication DE 10 2007 039 516 A1 discloses a method for configuring a communication port in a user-specific manner, the method comprising the step of providing a default profile, the default profile being directed to a specific user, and the method further comprising the step of assigning the user-specific default profile to a user-specific configuration profile, the user-specific configuration profile being assigned to a specific user.

SUMMARY

In an embodiment, the present invention provides a method for efficient initialization of a telecommunications network. The telecommunications network includes an access node, and an operation support system, the access node providing a plurality of network ports, and a configuration device being connected to one of the network ports, the one of the network ports being specified by a network port identification information. The method includes: establishing a physical communication channel between the access node of the telecommunications network and the configuration device; providing, by the telecommunications network, via an Internet Protocol Edge node, a public or private Internet Protocol address to the configuration device for use by the configuration device to communicate with the Internet Protocol Edge node of the telecommunications network; and assigning, by the telecommunications network, a configuration and installation functionality level to the public or private Internet Protocol address. The Internet Protocol address is associated with the network port identification information and an Internet Protocol session (IP session) or connection realizes a logical communication channel initiated between the Internet Protocol Edge node of the telecommunications network and the configuration device. The logical communication channel using the configuration and installation functionality level enables a communication between the configuration device and the operation support system using the physical communication channel between the access node of the telecommunications network and the configuration device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
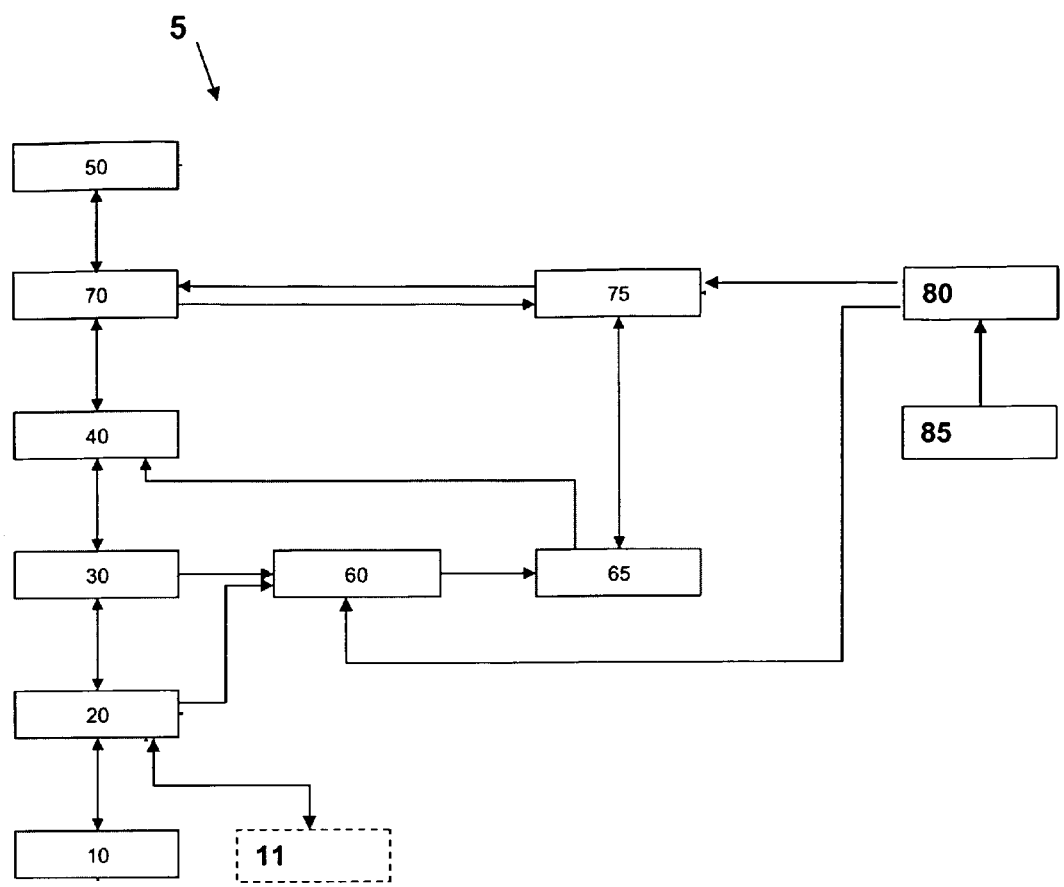
FIG. 1 illustrates schematically an example of a telecommunications network with a connected configuration device.

Embodiments of the present invention provide a method for efficient initialization of a telecommunications network, and a telecommunications network by means of providing a communication channel between the telecommunications network and a configuration device and by providing a control of the telecommunications network such that more efficient configuration of the telecommunications network as well as of telecommunications services is possible. The configuration device is defined as a combination of:

a functionality acting as a router functionality or any other functionality capable to establish an IP connectivity and being connected to the physical communication link, and a terminal functionality for interacting with a person.

The configuration device also can be a combination between a home gateway and a mobile PC or the like.

In an embodiment, the present invention provides a method for efficient initialization of a telecommunications network, the telecommunications network comprising an access node, and an operation support system, the access node providing a plurality of network ports, and a configuration device being connected to one of the network ports, the one of the network ports being specified by means of a network port identification information, wherein the method comprises the following steps:

establishing a physical communication channel between the access node of the telecommunications network and the configuration device, the telecommunications network providing, via an Internet Protocol Edge node, a public or private Internet Protocol address to the configuration device for use by the configuration device to communicate with the Internet Protocol Edge node of the telecommunications network, the telecommunications network assigning a configuration and installation functionality level to the public or private Internet Protocol address, the Internet Protocol address being associated with the network port identification information and an Internet Protocol session (IP session) or connection realizing a logical communication channel being initiated between the Internet Protocol Edge node of the telecommunications network and the configuration device, wherein the logical communication channel using the configuration and installation functionality level enables a communication between the configuration device and the operation support system using the physical communication channel between the access node of the telecommunications network and the configuration device.

In an embodiment, the present invention provides a method for efficient initialization of a telecommunications network, the telecommunications network comprising an access node, and an operation support system, the access node providing a plurality of network ports, and a configuration device being connected to one of the network ports, the one of the network ports being specified by means of a network port identification information, wherein the method comprises the following steps:

establishing a physical communication channel between the access node of the telecommunications network and the configuration device, the telecommunications network providing a public or private Internet Protocol address to the configuration device for use by the configuration device to communicate with the access node of the telecommunications network, the telecommunications network assigning a configuration and installation functionality level to the public or private Internet Protocol address, establishing a configuration and installation communication channel between the configuration device and the operation support system using the physical communication channel between the access node of the telecommunications network and the configuration device.

According to the present invention, a physical communication channel between the access node and the configuration device is used for configuration and installation purposes. During an operative use of the telecommunications network, the physical communication channel is provided between the access node and a configuration device of a user in demand of telecommunications services provided by the telecommunications network. Therefore, the physical communications link established between the access node and the configuration device is partially also described by means of describing the physical communications link between the access node and the configuration device with the difference that instead of the configuration device the configuration device is connected to the physical communication link.

According to the present invention, it is preferred that the configuration device requests the operation support system via the configuration and installation communication channel to configure the network port, and that network port identification information is used to initialize the network port for customer use.

Thereby, it is advantageously possible according to the present invention that in case of initializing new network resources, it is possible to efficiently assign network port identification information.

The physical communication link between the access node of the telecommunications network and the configuration device can be any wireline communication link. Such a wireline communication link usually comprises an end connected to the configuration device and an end connected to the access node of the telecommunications network. The access node according to the present invention is defined as any device terminating the access network, that is part of the telecommunications network, and the home network. The configuration device is capable of being connected to the physical communication link, e.g., by means of being linked (or plugged) to a transfer point or a building entrance interface. The physical communication link between the access node and the configuration device is also often referred to as the "last mile" (between the network components of the access network and the customer premises equipment. It is to be understood that the term "physical communication link between the access node of the telecommunications network and the configuration device" does not need to be an individual wireline communication link between the configuration device and the access node but can also be realized by means of an active device (e.g. ONU/ONT or Cable Modem) the configuration device is connected if a shared medium is used such as an optical fiber network based on GPON, a cable network or the like. Even a (partial) use of a wireless communication link such as a point-to-point radio system (or directional radio link) between the access node of the telecommunications network and the configuration device is to be understood as being a "physical communication link" in the sense that such a physical communication link comprises an end connected to the configuration device and an end connected to the access node of the telecommunications network.

Examples of a wireline communication link include a communication link via a pair of copper lines or a communication link via an optical fiber link or a communication link via a cable television access link. In case a communication link via a pair of copper lines is used, the configuration device is, e.g., linked to the telecommunications network by means of a so-called TAE (Telekommunikations Anschluss Einheit), APL (Abschlusspunkt Linientechnik, access point line technology or transfer point) and the pair of copper lines runs between the TAE/APL (in the subscribers home) to a Digital Subscriber Line Access Multiplexer (DSLAM) serving as access node of the telecommunications network. In case a communication link via an optical fiber link is used, the configuration device is, e.g., linked to the telecommunications network by means of a so-called ONU (Optical Network Unit) or ONT (Optical Network Termination) and the optical fiber link runs between the ONU/ONT (in the subscribers home) to an OLT (Optical Line Terminal) serving as access node of the telecommunications network. In case a communication link via cable television access link is used, the configuration device is, e.g., linked to the telecommunications network by means of a so-called CM (Cable Modem) and the cable television access link runs between the CM (in the subscribers home) to an CMTS (Cable Modem Terminal System) serving as access node of the telecommunications network.

According to the present invention, the logical communication channel is established between the Internet Protocol Edge node and the configuration device. The logical communication channel corresponds to an Internet Protocol session or connection. The physical communication channel (between the telecommunications network and the configuration device) is established between the access node and the configuration device. It is possible and preferred according to all embodiments of the present invention that the functionality of the Internet Protocol Edge node is at least partly integrated into the network node having the functionality of the access node or vice versa (i.e. that the functionality of the access node is at least partly integrated into the network node having the functionality of the Internet Protocol Edge node).

According to the present invention, the logical communication channel between the Internet Protocol Edge node and the configuration device (the Internet Protocol connection) is established by using at least one piece of authentication information, the at least one piece of authentication information being a trusted information existing within the telecommunications network, especially on the access node or access node port where the configuration device is physically connected to. This means in the context of the present invention that, in order to establish a completely functional Internet Protocol session or connection (i.e. the logical communication channel between the Internet Protocol Edge node and the configuration device), no distribution of credentials or personalized pre-configured configuration devices are necessary. It is only necessary that the telecommunications network, i.e. a control unit or a control function answers an authorization request for the Internet Protocol connectivity or Internet Protocol session (i.e. the logical communication channel) with only comprising a network port identification information as authentication information, hereinafter also called port ID, with a special authorization information instead of denying the authorization and that a configuration device, i.e. an arbitrarily configured configuration device, is connected physically to the specific port of the access node. Based on these technical conditions, an Internet Protocol session or connection is possible to be established for the configuration device. According to the present invention, initially, this Internet Protocol connectivity or Internet Protocol session (i.e. the logical communication channel) is preferably only functional based on an installation functionality level differing from the first functionality level a customer can use later. This first functionality level of an Internet Protocol connectivity or Internet Protocol session (i.e. the logical communication channel) only can be reached after an authentication based on a network access related identification information representing the physical communication channel, hereinafter also called Line ID.

According to a preferred embodiment of the present invention, the configuration device also could be a home gateway and a CPE of a customer, if the process to assign or correlate the port ID with a line ID is done by the customer itself.

According to a preferred embodiment of the present invention, the at least one piece of authentication information is independent from the configuration device, and the at least one piece of authentication information is related solely to either the access node or to other parts of the telecommunications network.

Thereby, it is advantageously possible to reduce the logistical effort for distributing the configuration device, for pre-configuring of configuration device devices or handling the at least one piece of authentication information, i.e. especially credentials or credential information, as prerequisite for an Internet Protocol session or connection.

According to a preferred embodiment of the present invention, the network access related identification information corresponds to or is a so-called line ID. The network access related identification information or the line ID represents the physical communication channel. The physical communication channel is necessarily located, i.e. leads from a specific access node to a specific transfer point (or vice versa), and therefore allows for the possibility to assign to the physical communication channel not only its identity (network access related identification information) but also its location, e.g. in the form of an postal address or in the form of specifying a specific apartment inside an apartment building. The location of the physical communication channel preferably relates primarily to its remote end (i.e. the customer premise or the starting point of the physical communication link between the configuration device and the access node). A network port identification information, hereinafter also called port ID, identifies the port of the access node which is connected to the physical connection towards the home gateway. It is possible according to the present invention to associate a line ID (i.e. the network access related identification information) to the port of an access node, so both identifiers can be transported within technical protocols in the telecommunication network.

After an initial request of the configuration device (during operative use of the telecommunications network) or of the configuration device (in case of installation or maintenance situations) to the access node for requesting a telecommunications network service (i.e. for establishing a data transmission connection), the access node complements the request of the configuration device by the information element of the port ID. This is preferably done via the DHCP protocol (Dynamic Host Configuration Protocol), preferably using DHCP option 82 or PPPoE (Point-to-Point Protocol over Ethernet), preferable using PPPoE intermediate agent.

The telecommunications network preferably comprises a so-called Internet Protocol Edge node. The Internet Protocol Edge node administers the distribution of Internet Protocol addresses towards the configuration device as well as different functionality levels associated with different Internet Protocol addresses the configuration device can address. Hence, the Internet Protocol Edge node can be understood as being a routing device having a plurality of access and permission rules associated with different Internet Protocol addresses on different virtual interfaces. An Internet Protocol address given to the configuration device having a reduced functionality level, e.g., is only permitted to a limited access range of target Internet Protocol addresses. An Internet Protocol address having an increased functionality level, e.g., is permitted to an enhanced access range of target Internet Protocol addresses with a default route to the internet.

According to the present invention, there are a number of different functionality levels that can be associated or assigned to an Internet Protocol address given to the configuration device: A reduced functionality level is available to any functional physical communication channel between any port of an access node of the telecommunications network and any associated configuration device operational with this kind of access node. Such a reduced functionality level is used according to the present invention to provide a basic connectivity for maintenance usage.

According to a preferred embodiment of the present invention, the telecommunications network comprises a control function, wherein a request with unknown or missing network access related identification information from an IP edge node results in an IP connectivity authorized by the control function with an installation functionality level of service permissions and a session held by the control function containing the provided network port identification information from the access node and the IP address provided to the configuration device.

In the context of the present invention, the term "contract related identification information" is related to an information that is either linked to an authorization information for services like internet service and/or a VoD service and/or a telephone (VoIP) service and/or a television over IP service) and/or other internet provider services like e-mail or portal services;

or linked to an authorization information derived from a pre-paid contract related to a specific service a user has with the service provider;

or linked to an authorization information derived from another contractual or quasi-contractual relationship with the service provider such as a promotional offer, a voucher or the like.

According to the present invention, the control function administers the request by the Internet Protocol Edge node with providing only a port ID and no line ID for authentication such that a specific profile of service permissions are assigned or associated to the Internet Protocol address requested by the configuration device, the profile of service permissions being defined according to the configuration and installation requirements of the configuration device. Therefore, the profile of service permissions associated to the Internet Protocol address provided to the configuration device is hereinafter also called a configuration and installation functionality level.

According to another preferred embodiment of the present invention, the telecommunications network comprises a Customer Relation Management function, wherein the Customer Relation Management function requests the initialization of the network port at the operation support system by requesting to assign the line ID (i.e. the network access related identification information) and the port ID (i.e. the network port identification information). It is preferred that a so-called field service function exists that is either a special part of the operation support system or a network entity independent from the operation support system. Either the operation support system directly contacts the configuration device or the configuration device is contacted by the field service function (e.g. on request by the service management entity or function) such that the initiation of the process to assign or correlate the port ID with a line ID is started.

According to another preferred embodiment of the present invention, the assignment of the first functionality level to the public or private Internet Protocol address is effected within 100 seconds from assigning the line ID and the port ID, preferably within 30 seconds, more preferably within 10 seconds, still more preferably within 3 seconds and most preferably within 1 second.

According to another preferred embodiment of the present invention, the assignment of the second functionality level to the public or private Internet Protocol address is effected within 100 seconds from assigning the line ID to a contract related information and the entity holding the authorization information, preferably within 30 seconds, more preferably within 10 seconds, still more preferably within 3 seconds and most preferably within 1 second.

Thereby, it is advantageously possible to almost immediately configure the network parameters such that a modification of the service settings of a user can be used.

According to the present invention, it is preferred that the Internet Protocol Edge node communicates with a control function of the telecommunications network in order to obtain authorization information. The authorization information is used by the Internet Protocol Edge node to associate a specific functionality level to the public or private Internet Protocol address provided to the configuration device. The request of the authorization information is based on the port ID as network port identification information. According to the present invention, the control function is realized by means of a centralized authentication, authorization, and accounting (AAA) function or an associated AAA node. The authentication and/or authorization function associated with the control function is realized, e.g., by means of a RADIUS (Remote Authentication Dial In User Service (RADIUS)) server node or by means of a DIAMETER server node (or by means of a corresponding function realizing a RADIUS functionality). The control function provides information to the Internet Protocol Edge node that is related to the functionality level of the Internet Protocol address. This means that a memory is assigned to the control function (or a control node comprises the memory) such that the network port identification information (e.g. the port ID) is associated to information relating to the specific functionality level associated to a certain operational state of an installation of new network resources and/or the verification of a correct network configuration (installation functionality level). The information relating to the functionality level comprises, e.g., information regarding the potentially addressable range of Internet Protocol addresses and the allowed and/or usable bandwidth.

Such information relating to the functionality level might be stored in the memory device associated with the control function in the form of so-called policies and/or in the form of dedicated single information and are used for the authorization of a request received by the control function from an Internet Protocol Edge node.

According to the present invention, it is preferred that the control function is able to force the Internet Protocol Edge node to implement changes in the functionality level even for a working connection having a working IP address. For example, this can be realized by means of a change of authorization request. According to the present invention, it is preferred that such a change in the functionality level (associated with a working connection of the configuration device with the telecommunications network using the Internet Protocol address initially provided) is realized by means of a communication between the control function and the Internet Protocol Edge node. For example, the Internet Protocol Edge node acknowledges a command to restrict or expand the functionality level by means of an "Accounting Stop" message (in case an Internet Protocol connectivity already exists between the configuration device and the Internet Protocol Edge) and a subsequent "Accounting Start" message towards the control function. This is preferable done without interrupting the Internet Protocol connectivity of the configuration device.

According to the present invention, it is preferred that the initial provisioning of an Internet Protocol address for the connectivity of the configuration device towards the telecommunications network (i.e. between the configuration device and the access node) is realized by the Internet Protocol Edge node or by the control function.

According to the present invention, it is further preferred that the control function is able to establish an IP connectivity especially in case no line ID is provided for authentication (e.g. in case of maintenance situations or the like). In this case, a special authorization profile (i.e. the configuration and installation functionality level) has to be provided to the IP edge for basic communication between the configuration device and the operator of the telecommunication network.

The present invention furthermore also relates to a telecommunications network comprising a plurality of network nodes, the telecommunications network being provided for efficient initialization of the telecommunications network, wherein the telecommunications network comprises an access node, and an operation support system, the access node providing a plurality of network ports, and a configuration device being connected to one of the network ports, the one of the network ports being specified by means of a network port identification information, wherein a physical communication channel is established between the access node of the telecommunications network and the configuration device, wherein a public or private Internet Protocol address is provided, via an Internet Protocol Edge node, to the configuration device for use by the configuration device to communicate with the telecommunications network, wherein the Internet Protocol address is associated with the network port identification information and an Internet Protocol session (IP session) or connection realizing a logical communication channel is initiated between the Internet Protocol Edge node of the telecommunications network and the configuration device, wherein the logical communication channel using the configuration and installation functionality level enables a communication between the configuration device and the operation support system using the physical communication channel between the access node of the telecommunications network and the configuration device.

The present invention furthermore also relates to a telecommunications network comprising a plurality of network nodes, the telecommunications network being provided for efficient initialization of the telecommunications network, wherein the telecommunications network comprises an access node, and an operation support system, the access node providing a plurality of network ports, and a configuration device being connected to one of the network ports, the one of the network ports being specified by means of a network port identification information, wherein a physical communication channel is established between the access node of the telecommunications network and the configuration device, wherein a public or private Internet Protocol address is provided to the configuration device for use by the configuration device to communicate with the access node of the telecommunications network, wherein a configuration and installation functionality level is assigned to the public or private Internet Protocol address, and wherein a configuration and installation communication channel is established between the configuration device and the operation support system using the physical communication channel between the access node of the telecommunications network and the configuration device.

Further subjects of the present invention include a program comprising a computer readable program code for controlling an operation support system and/or a configuration device to perform an inventive method and a computer program product comprising such a program.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, an example of a telecommunications network 5 with a connected customer is schematically represented. The customer is connected to the telecommunications network 5 using a so-called CPE or a dedicated CPE with capabilities to establish an IP connectivity like a PC, a settop box or any other device. 10. The CPE 10 is, e.g., a routing device installed in the user's home. Further customer premises equipment (CPE) might be present connected to the CPE. The configuration device is seen equal to this described setup. The configuration device is defined as a combination of:

a functionality acting as a router functionality or any other functionality capable to establish an IP connectivity and being connected to the physical communication link, and a terminal functionality for interacting with a person.

The configuration device also can be a combination between a home gateway and a (mobile) PC or the like. The configuration device 11 preferably has a TCP/IP stack and is able to request an Internet Protocol address (e.g. using a DHCP protocol or a PPPoE protocol).

The configuration device 11 is connected to the telecommunications network 5 via an access node 20. The access node 20 is preferably a Digital Subscriber Line Access Multiplexer (DSLAM) installed either in the building of the customer or installed at a distance of less than a few kilometers, preferably less than 1000 meters, more preferably less than 500 meters or an OLT (Optical Line Terminal) serving as access node of the telecommunications network.

The access node 20 is connected to an Internet Protocol Edge node 30 within the telecommunications network 5. The Internet Protocol Edge node 30 administers the distribution of Internet Protocol addresses as well as different functionality levels associated with different Internet Protocol addresses, the configuration device can access. The Internet Protocol Edge node 30 can be understood as being a routing device having a plurality of access and permission rules regarding different Internet Protocol addresses on different virtual interfaces. Especially, the Internet Protocol Edge node 30 controls which addresses and functions are accessible by the configuration device 11 on Layer 3 and Layer 4 of the OSI-Model.

The telecommunications network 5 further comprises a control function 40. According to the present invention, the control function 40 is realized by means of a centralized authentication, authorization, and accounting (AAA) function or an associated AAA node. The authentication and/or authorization functions associated with the control function 40 is realized, e.g., by means of a RADIUS (Remote Authentication Dial In User Service (RADIUS)) server node or by means of a DIAMETER server node (or by means of a corresponding function realizing a RADIUS functionality). According to the present invention, it is possible and preferred that—instead of the Internet Protocol Edge node 30—the control function 40 administers the distribution of Internet Protocol addresses as well as different functionality levels associated with different Internet Protocol addresses, the configuration device can access.

The Internet Protocol Edge node 30 furthermore controls the session-accounting for the control function 40. Additionally, the Internet Protocol Edge node 30 is able to use an identifier information or a credential information, obtained or received from the access node 20, for authentication purposes with the control function 40. For authentication purposes, i.e. as a piece of authentication information, the line ID is used. Furthermore, the Internet Protocol Edge node 30 transmits the port ID from the access node 20. The Internet Protocol Edge node 30 furthermore controls the bandwidth (on an Internet Protocol level) for the upstream and downstream dataflow for one or more defined data classes.

According to a preferred embodiment according to the present invention, the Internet Protocol Edge node 30 manages or allocates the Internet Protocol addresses (IP-addresses) of the configuration device 11 according to rules or rule information received by the control function 40 (especially received by the Internet Protocol Edge node 30 in return to an access request message to the control function 40).

The telecommunications network 5 further comprises an operation support system 60. The operation support system 60 is especially used to manage the different entities of the access network, i.e. the part of the telecommunications network 5 used to provide access to a comparably important number of users to the telecommunications network 5. Furthermore, the telecommunications network 5 comprises a network identity provider (hereinafter also called network IDP) 65. The network IDP 65 is especially used to handle managing of authentication and authorization for the different ports of one or a plurality of access nodes 20 out of the plurality of access nodes 20 of the telecommunications network 5. The operation support system 60 is linked to the access node 20 such as to be able to initialize the access node 20. The operation support system 60 provides a management connection to the access node 20, preferably by means of an Internet Protocol (IP) connection. This is, e.g., done by using a management address such as an Internet Protocol (IP) address which is specifically reserved for managing or initializing a specific access node 20.

The telecommunications network 5 further comprises an A&A function (authorization and authentication function) 70 for applications and/or an IMS functionality. The A&A function 70 is especially used to authenticate (i.e. the process where an entity's identity is authenticated, typically by providing evidence that it holds a specific digital identity such as an identifier and the corresponding credentials) and to authorize (i.e. whether a particular entity is authorized to perform a given activity) users and/or devices within the telecommunications network 5 towards an application and/or IMS.

Furthermore, the telecommunications network 5 comprises an application identity provider (hereinafter also called application IDP) 75. The application IDP 75 is especially used to handle the different users and/or devices of the telecommunications network 5. The application IDP 75 and the network IDP 65 are able to federate the contract related identification information (hereinafter also called a user identity or user ID) with the network access related identification information, i.e. the identity of a network termination location or a network port (e.g. the port of an access node) by means of a federation interface.

The telecommunications network 5 further comprises an application function or application entity 50 (especially an application of the Internet Protocol Multimedia Subsystem (IMS) system of the telecommunications network 5).

According to the present invention, the telecommunications network 5 preferably comprises a Customer Relation Management function 80 or a corresponding unit. Hereinafter, the term Customer Relation Management function 80 is used to refer to such a unit as well. The Customer Relation Management function 80 is provided as a function to create customer identities (for handling new customers) and corresponding contracts. The Customer Relation Management function 80 is the master of customer, product and contract data. The Customer Relation Management function 80 comprises or is assigned to a request or order management component (or order management function) like in the meaning of "Order Handling" and "Service Configuration and Activation" shown in the eTom model (not explicitly shown) that processes the different requests (e.g. related to the generation of a new customer data element or a fulfillment process) and forwards corresponding requests to other parts of the telecommunications network 5.

According to the present invention, it is furthermore preferred that the telecommunications network 5 also comprises a customer self care interface 85 or a customer self care portal 85. The customer self care portal 85 provides the possibility to a user (or customer) of the telecommunications network 5 to configure the network access.

According to the present invention, a configuration device 11 can be connected to the access node 20 for configuration and/or installation purposes. In normal operative use of the telecommunications network 5, the configuration device 11 is not connected to (all of) the access nodes 20.

Preferably, the customer self care portal 85 supports a user authentication against the application IDP and determines—as a prerequisite for a federation—the line ID that corresponds to the Internet Protocol address used during the authentication process against the control function 40. Preferably, it is possible that the federation process between a user ID and a line ID is also initiated:

by means of transmitting an order ID to the application IDP, the order ID being related to a user ID, and/or by means of transmitting an order ID to the network IDP, the order ID being related to a line ID.

Furthermore, a provisioning interface is preferably provided from the application IDP to the network IDP such that an update of the services accessible to a line ID (i.e. the functionality level associated to the IP address, e.g., assigned to a network port or to a configuration device 11 or any other device connected to the access node 20) can be changed by means of the line ID or by means of a handle (preferably an opaque handle) to the line ID. According to the present invention, also a (complete or partial) de-federation between a user ID and a line ID (which results to i.e. a removal of the right to use a specific service or the reduction of rights or usable bandwidth) is possible, preferably by means of the customer self care portal. In the following, only the case of a federation is explicitly mentioned but the de-federation case is also possible according to the present invention.

The execution of the federation process necessitates a user ID and a line ID. According to a first alternative of the federation process, an explicit user authentication (i.e. a determination of the user ID) is performed with the customer self care portal. By using a network resource to contact the customer self care portal, i.e. by using a network port of an access node 20, also the line ID is available when such a user authentication with the customer self care portal is performed. According to a second alternative of the federation process, the line ID is determined via a location search. Another search also provides a user ID (e.g. after asking the customer for his user name or any other known information assigned to the user ID like a special secret). Both the first and the second alternative of the federation process leads to the possibility to federate the user ID and the line ID. The federation process as well as each later change relating to the services associated to a user ID results in a request of the application IDP 75 to the network IDP 65. Thereby, the application IDP 75 uses preferably the line ID federated to the user ID or a corresponding handle. As a result, the network IDP 65 performs an update of the stored data in (or associated with) the control function 40, namely:

an update of the permissions stored in a persistent database relating to the line ID, an update of the permissions stored in a session database relating to an existing Internet Protocol connection, e.g. by means of a change-of-authorization request to the Internet Protocol Edge node 30.

As a result of the federation process, line ID and user ID are federated, the network IDP 65 and the control function 40 comprise an authorization information for each line ID related to the permitted network services (such as addressable Internet Protocol address ranges and usable bandwidth including the possibility to access a multicast replication point). The possibly existent Internet Protocol connection of a configuration device 11 with an Internet Protocol Edge node 30 is re-parameterized. According to the present invention, it is preferably advantageous that it is possible to federate a user ID with a line ID both by means of a 1 to 1 relationship and by means of a 1 to n relationship. This means that one and the same user can have network service access on a plurality of different line IDs.

According to the present invention, the telecommunications network 5 is preferably provided as a so-called NGN (next generation network). Generally, NGN telecommunications networks 5 comprise four different planes or network layers, namely a first network plane 1 assigned to the access (access plane 1), a second network plane 2 assigned to the transport of data (transport plane 2), a third network plane 3 assigned to controlling (control plane 3), and a fourth network plane 4 assigned to the applications (application plane 4).

Figure 2:
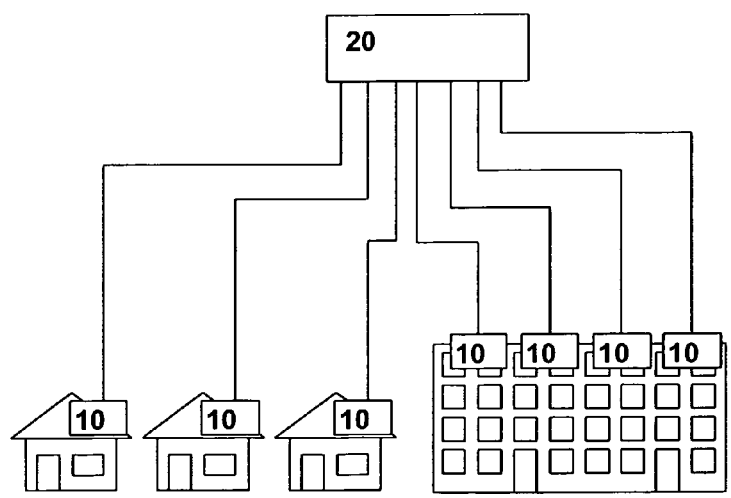
FIG. 2 illustrates schematically an example of a more detailed representation of physical communication channels between an access node and a plurality of CPEs.

In FIG. 2, an example of a more detailed representation of physical communication channels between an access node 20 and a plurality of CPEs 10 is schematically shown. As can be seen from the representation in FIG. 2, an access node 20 be (and preferably is) connected to a plurality of different CPEs 10, e.g. located in different homes. On the left hand side of FIG. 2, a plurality of individual houses are schematically represented. In each of these houses a CPE 10 is located providing individual access to the telecommunications network 5. On the right hand side of FIG. 2, an apartment building is schematically represented having a plurality of different apartments and each apartment having a CPE 10 providing individual access to the telecommunications network 5. The different lines running from the access node 20 to the CPEs 10 (of the houses or of the apartment building)

Figure 3:
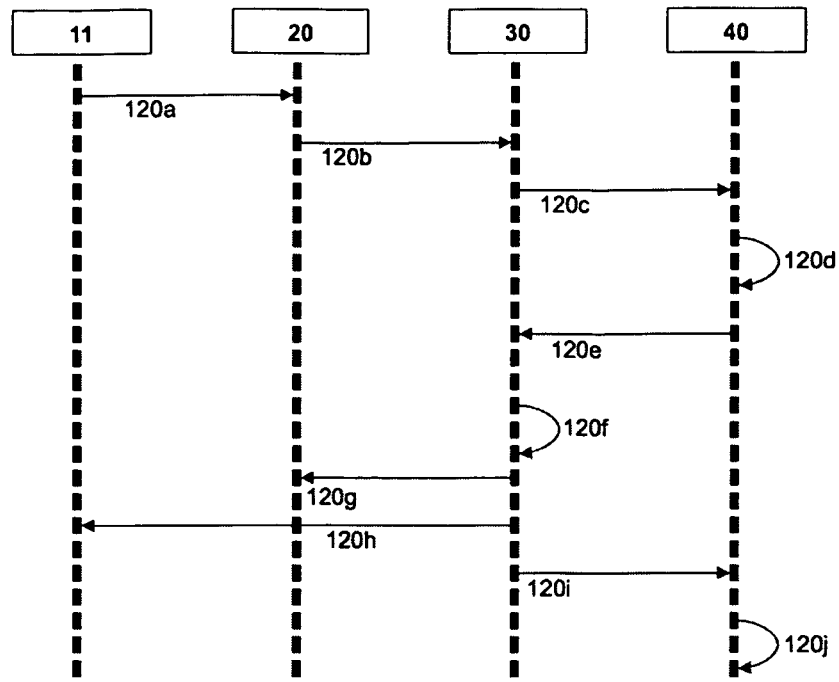
FIG. 3 illustrates schematically a communication diagram related to providing Internet Protocol connectivity to a configuration device and initializing a communication connection.
Figure 4:
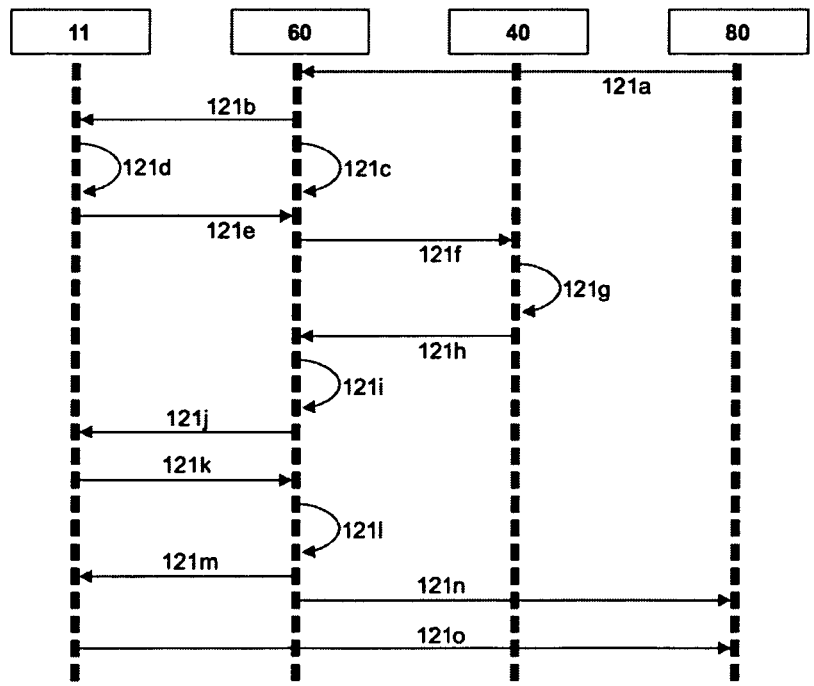
FIG. 4 illustrates schematically a communication diagram related to the initialization process for initializing an access node out of a plurality of access nodes of the telecommunications network in such a way that communication access and especially Internet Protocol connectivity of a configuration device to the telecommunications network can be provided via the access node.

FIGS. 3 and 4 illustrate the process of assigning a network port identification information (or port ID) and a network access related identification information (or line ID) according to a first embodiment of the present invention. With respect to the description of FIGS. 3 and 4, a first to a twenty-fifth step and corresponding first to twenty-fifth messages or processings 120a to 121o are mentioned which only refer to the description of FIGS. 3 and 4.

In FIG. 3, a communication diagram related to (the first part of) the assignment of the port ID (or network port identification information) and line ID (or network access related identification information) is schematically illustrated by means of a multitude of different messages exchanged between the configuration device 11, the access node 20, the Internet Protocol Edge node 30 and the control function 40. This corresponds for example to the situation of installing and/or configuring a new access port (of the access node 20) or a new physical communication channel between the access node 20 and a configuration device 11. In this situation, the configuration device 11 is used to connect to a network port of the access node 20. The network port (of the access node 20) to be configured is known to the operation support system 60. In the situation of an installation of the new physical communication channel, the operation support system 60 does not have a network access related identification information (or line ID) corresponding to the network port to be configured or installed. Furthermore, the network port to be configured or installed is not known to the network IDP 65 or to the control function 40. The configuration device 11 can connect to the operation support system 60 via an (Internet Protocol) interface.

In a first step, involving a first message 120a, the configuration device 11 requests an Internet Protocol address at the access node 20. In a second step, involving a second message 120b, the request of the configuration device 11 is forwarded by the access node 20 to the Internet Protocol Edge node 30 and the access node 20 adds the network port identification information (port ID) as well as network parameters to the request. In a third step, involving a third message 120c, the request of the configuration device 11 is forwarded by the Internet Protocol Edge node 30 to the control function 40. In a fourth step, involving a processing 120d, the control function 40 determines the authorization for the physical communication channel used and provides a profile related to the installation or configuration purposes of the configuration device 11, i.e. a profile corresponding to a configuration and installation functionality level. In a fifth step, involving a fifth message 120e, the control function 40 transmits the authorization to the Internet Protocol Edge node 30. In a sixth step, involving a processing 120f, the Internet Protocol Edge node 30 parameterizes the Internet Protocol connection between the Internet Protocol Edge 30 and the configuration device 11. In a seventh step, involving a seventh message 120g, the Internet Protocol Edge node configures the access node 20 such that e.g. the consumption of multicast is disabled. In an eighth step, involving an eighth message 120h, the Internet Protocol address and further configuration parameters is/are forwarded to the configuration device 11. In a ninth step, involving a ninth message 120i, the Internet Protocol Edge node 30 transmits the information to the control function 40 that the respective Internet Protocol address on the respective network port identification information (port ID) (to which the configuration device 11 is connected) is enabled (accounting start). In a tenth step, involving a processing 120j, the control function 40 proceeds with the initialization of the accounting process related to the network port identification information (port ID).

As a result, an Internet Protocol functionality level has been granted to the configuration device that corresponds to a configuration and installation functionality level.

In FIG. 4, a communication diagram related to (the second part of) the assignment of the port ID (or network port identification information) and line ID (or network access related identification information) is schematically illustrated by means of a multitude of different messages exchanged between the configuration device 11, the operation support system 60, the control function 40 and the Customer Relation Management function 80. The configuration device 11 is used to connect to a network port of the access node 20. After the first part of the assignment of the port ID (or network port identification information) and line ID (or network access related identification information), the port ID corresponding to the Internet Protocol address is known to the control function 40 and a configuration and installation communication channel has been established between the configuration device 11 and the operation support system 60. In an eleventh step, involving an eleventh message 121a, the Customer Relation Management function 80 transmits a request to assign the line ID and the port ID to the operation support system 60. Thereby, an identification information (or transaction number TAN) for the assignment of the line ID and the port ID as well as the line ID and optionally an alias to the line ID is transmitted. In a twelfth step, involving a twelfth message 121b, the operation support system 60 transmits a request to assign the line ID and the port ID to the configuration device 11. Thereby, the identification information (or transaction number TAN) for the assignment of the line ID and the port ID as well as the line ID and optionally an alias to the line ID is transmitted. In a thirteenth step, involving a processing 121c, the operation support system 60 generates an assignment transaction with the order ID from the Customer Relation Management function 80, the line ID and potentially an alias to the line ID and the identification information TAN. The twelfth and the thirteenth step can be executed as described or in reversed order, i.e. the thirteenth step prior to the twelfth step. In a fourteenth step, involving a processing 121d, the configuration device 11 also generates an assignment transaction with the order ID from the Customer Relation Management function 80, the line ID and potentially an alias to the line ID and the identification information TAN. In a fifteenth step, involving a fifteenth message 121e, the configuration device 11 generates an Internet Protocol connection to the operation support system 60 and starts an inventory application (inventory case) using the order ID obtained from the Customer Relation Management function 80. In a sixteenth step, involving a sixteenth message 121f, the operation support system 60 requests at the control function 40 the port ID relating to the Internet Protocol address used. In a seventeenth step, involving a processing 121g, the control function 40 retrieves the port ID related to the Internet Protocol address used and transmits the result to the operation support system 60 in an eighteenth step, involving an eighteenth message 121h. In a nineteenth step, involving a nineteenth processing 121i, the operation support system 60 verifies the legitimacy for the inventory application (inventory case). Potential error cases include the existence of a relation between the used port ID and a line ID, and the generation of an inventory application (inventory case) is not possible because the order ID is not known or because the order is outdated or has already been processed. In a twentieth step, involving a twentieth message 121j, the operation support system 60 requests the line ID (or a defined alias to the line ID) from the configuration device 11. The configuration device 11 prompts the installation technician to input the line ID and the line ID is transmitted to the operation support system 60 by means of a twenty-first message 121k in a twenty-first step. In a twenty-second step, involving a processing 121l, the operation support system 60 verifies whether the line ID (or the line ID obtained from the alias of the line ID) corresponds to the line ID obtained from the order information received from the Customer Relation Management function 80. In this case, the operation support system 60 stores the port ID and the line ID and terminates the inventory application (inventory case) with regard to the configuration device 11 by means of a twenty-third message 121m in a twenty-third step. The configuration device 11 displays the successful assignment of the port ID and the line ID to the installation technician. In a twenty-fourth step, involving a twenty-fourth message 121n, the operation support system 60 terminates the inventory application (inventory case) with regard to the Customer Relation Management function 80 and in a twenty-fifth step, involving a twenty-fifth message 121o, the configuration device 11 terminates the inventory application (inventory case) with regard to the Customer Relation Management function 80.

As a result, the port ID and the line ID are stored in an inventory database. The identification of the port ID has occurred fully automatically. Optionally, the configuration of the network port of the access node 20 (especially regarding sync bandwidths and/or transmission bandwidths) can be realized during the described assignment process of the port ID and the line ID. In this case, the operation support system 60 proceeds with this configuration after the assignment process but prior to the twenty-fourth message 121n to the Customer Relation Management function 80. In case the connection is dropped between the configuration device and the access node because of a re-synchronization step, the configuration device has to reconnect to the OSS to acknowledge the successful resync before the twenty-fourth message 121n is sent out.

Afterwards the operation support system 60 publishes the line ID to the network IDP 65 resulting in a provisioning to the control function 40 and a re-parameterization request from the control function 40 to the Internet Protocol Edge node 30 for an Internet Protocol connection with the first functionality level.

Preferably, the configuration device 11 comprises one or a plurality of cartridges provided for different types of access nodes 20 (e.g. ADSL, VDSL, optical fiber or coaxial cable). Furthermore, the configuration device 11 preferably comprises a human-machine-interface, preferably with a display and/or input means.

Another configuration and installation situation occurs in case that a verification should occur regarding the different line Ids and port Ids provisioned in the operation support system 60. Therefore, an active transfer point device or an active APL device is used according to a preferred embodiment of the present invention.

The active APL device (or active transfer point device) has the following properties:

the active APL device is connected to a plurality of wirelines corresponding to a plurality of incoming physical communication channels (e.g. twisted copper pairs), a connection (using one of the physical communication channels) between the active APL device and the operation support system 60 is realized (e.g. via a serial connection or via a xDSL-connection), a configuration device functionality is realized in the active APL device (i.e. a xDSL-Modem, a CPU (Central Processing Unit), a memory, and a TCP/IP-Stack), the physical communication channels (e.g. twisted copper pair) leading to the configuration device, i.e. the outgoing physical communication channels, are optionally connected to the active APL device, the active APL device comprises a circuit that is able to separate the incoming physical communication channels from the outgoing physical communication channels (which provides the possibility to conduct an attenuation measurement between the access node 20 and the active APL device, the active APL device comprises another circuit that is able to associate the configuration device functionality to one of the incoming physical communication channels.

Via a configuration and installation communication channel, the active APL device is connected to the operation support system 60 and the active APL is registered in the operation support system 60. The operation support system 60 has stored information regarding the line ID and the port ID for each incoming physical communication channel linked to the active APL device. Furthermore, a diagnostics application can be executed on the configuration device functionality of the active APL device such that the operation support system 60 is able to send a line ID to the diagnostics application. Via the configuration and installation communication channel, the operation support system 60 can define which of the incoming physical communication channels should be associated with the configuration device functionality.

The proceeding to verify the configuration and data relating to the line ID and the port ID stored in the operation support system 60 is provided as follows:

the operation support system 60 instructs the active APL device to associate the configuration device functionality to a specific incoming physical communication channel, the operation support system 60 instructs (the diagnostics application of) the active APL to send a line ID to the operation support system 60 (or a diagnostics portal), the operation support system 60 or the diagnostics portal retrieves (using the control function 40) the line ID related to (the Internet Protocol connection on) the used physical communication channel, in case that the retrieved line ID corresponds to the line ID provided by the diagnostics application, the stored information regarding the line ID and the port ID is correct within the operation support system.

As a result, the connections between the physical communication channels at the active APL device and the access node have been verified.

Figure 5:
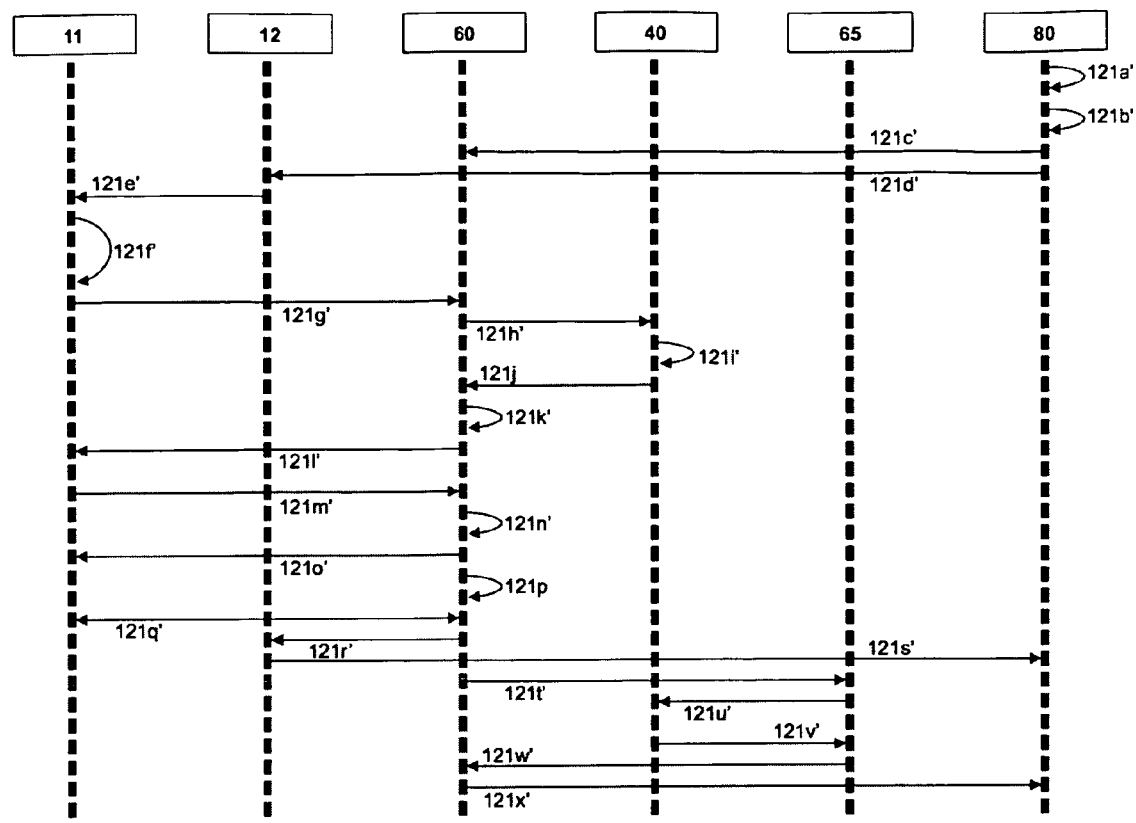
FIG. 5 illustrates schematically a communication diagram related to a variant of the initialization process for initializing an access node out of a plurality of access nodes of the telecommunications network in such a way that communication access and especially Internet Protocol connectivity of a CPE to the telecommunications network can be provided via the access node.

FIGS. 3 and 5 illustrate the process of assigning a network port identification information (or port ID) and a network access related identification information (or line ID) according to a second embodiment of the present invention. With respect to the description of FIGS. 3 and 5, a first to a thirty-fourth step and corresponding first to thirty-fourth messages or processings 120a to 121x' are mentioned which only refer to the description of FIGS. 3 and 5.

Analogously to the first embodiment of the present invention (as described above), also for the second embodiment of the present invention, FIG. 3, illustrates a communication diagram related to (the first part of) the assignment of the port ID (or network port identification information) and line ID (or network access related identification information). A multitude of different messages are exchanged between the configuration device 11, the access node 20, the Internet Protocol Edge node 30 and the control function 40. This corresponds for example to the situation of installing and/or configuring a new access port (of the access node 20) or a new physical communication channel between the access node 20 and a configuration device 11. The network port (of the access node 20) to be configured is known to the operation support system 60. In the situation of an installation of the new physical communication channel, the operation support system 60 does not have a network access related identification information (or line ID) corresponding to the network port to be configured or installed. Furthermore, the network port to be configured or installed is not known to the network IDP 65 or to the control function 40. The configuration device 11 can connect to the operation support system 60 via an (Internet Protocol) interface.

In a first step, involving a first message 120a, the configuration device 11 requests an Internet Protocol address at the access node 20. In a second step, involving a second message 120b, the request of the configuration device 11 is forwarded by the access node 20 to the Internet Protocol Edge node 30 and the access node 20 adds the network port identification information (port ID) as well as network parameters to the request. In a third step, involving a third message 120c, the request of the configuration device 11 is forwarded by the Internet Protocol Edge node 30 to the control function 40. In a fourth step, involving a processing 120d, the control function 40 determines the authorization for the physical communication channel used and provides a profile related to the installation or configuration purposes of the configuration device 11, i.e. a profile corresponding to a configuration and installation functionality level. In a fifth step, involving a fifth message 120e, the control function 40 transmits the authorization to the Internet Protocol Edge node 30. In a sixth step, involving a processing 120f, the Internet Protocol Edge node 30 parameterizes the Internet Protocol connection. In a seventh step, involving a seventh message 120g, the Internet Protocol Edge node configures the access node 20 such that e.g. the consumption of multicast is disabled. In an eighth step, involving an eighth message 120h, the Internet Protocol address and further configuration parameters is/are forwarded to the configuration device 11. In a ninth step, involving a ninth message 120i, the Internet Protocol Edge node 30 transmits the information to the control function 40 that the respective Internet Protocol address on the respective network port identification information (port ID) (to which the configuration device 11 is connected) is enabled (accounting start). In a tenth step, involving a processing 120j, the control function 40 proceeds with the initialization of the accounting process related to the network port identification information (port ID).

As a result, an Internet Protocol functionality level has been granted to the configuration device that corresponds to a configuration and installation functionality level. The configuration device is provided with an Internet Protocol session (IP session) or connection with a node of the telecommunications network, e.g. with the Internet Protocol Edge node 30. By means of a specific functionality level of this Internet Protocol connection, the access of the configuration device is limited to internal services and network configuration information of the telecommunications network.

Technically, the physical connection can be realized through different locations of the telecommunications network, e.g. the HVT (Hauptverteiler, central office), the KVZ (Kabelverzweiger, street cabinet) or the APL (Anschlusspunkt Linientechnik, access point line technology or transfer point). Even if the physical connection can be realized at different locations, the correct location of the transfer is validated, e.g. by a technician.

In FIG. 5, a communication diagram related to (the second part of) the assignment of the port ID (or network port identification information) and line ID (or network access related identification information) is schematically illustrated by means of a multitude of different messages exchanged between the configuration device 11 (or the technician himself with the configuration device 11), a field service 12, the operation support system 60, the control function 40, the network IDP, and a Customer Relation Management function 80. The configuration device 11 is used to connect to a network port of the access node 20. After the first part of the assignment of the port ID (or network port identification information) and line ID (or network access related identification information), the port ID corresponding to the Internet Protocol address is known to the control function 40 and a configuration and installation communication channel has been established between the configuration device 11 and the operation support system 60. In an eleventh step, involving a processing 121a', the Customer Relation Management function 80 searches, due to an order, a line ID with a location as well as a port ID. In a twelfth step, involving a processing 121b', the Customer Relation Management function 80 generates an order comprising an order ID, the line ID, the port ID, the location of the mount event, as well as a transaction number TAN, and communicates these information in a thirteenth step, involving a thirteenth message 121c', to the operation support system 60, and in a fourteenth step, involving a fourteenth message 121d', to the field service 12. The operation support system 60 as well as the field service 12 generate mount transactions relating to the order ID and to the transmitted parameters. In a fifteenth step, involving a fifteenth message 121e', the field services 12 transmits the port ID, the location of the mount event, and the transaction number TAN to the configuration device or the technician 11. In a sixteenth step, involving a processing 121f', the mount event occurs, i.e. the technician realizes, in case of using copper wires, a connection between the mounting location and the port related to the port ID. In case of an optical connection, the mount event involves to mount the ONT on the mounting location. Additionally, the processing 121f' involves the establishment of an Internet Protocol connection and starting an inventory procedure with the operation support system 60, transmitting an assembly request using the Internet Protocol connection in a seventeenth step, involving a seventeenth message 121g'. In an eighteenth step, involving an eighteenth message 121h', the operation support system 60 requests the port ID related to the Internet Protocol session at the control function 40. In a nineteenth step, involving a processing 121i', the control function determines the port ID related to the Internet Protocol session. In a twentieth step, involving a twentieth message 121j', the control function 40 answers the request by transmitting the port ID to the operation support system 60. In a twenty-first step, involving a processing 121k', the operation support system searches the order ID related to the port ID and a check occurs whether the order ID is valid. The potential causes of invalid order ID comprise the non-existence of an order ID (related to that port ID) or the fact that the order ID is outdated or already used previously. In case that the operation support system 60 accepts the inventory request, the operation support system transmits, in a twenty-second step and involving a twenty-second message 121l', to the configuration device 11 an indication of the location as well as a request for a transaction number TAN. In a twenty-third step, involving a twenty-third message 121m', the target location is acknowledged by entering the transaction number TAN in the configuration device 11. In a twenty-fourth step, involving a processing 121n', the operation support system 60 checks whether the transaction number TAN is valid for the order ID and creates an inventory with the line ID, the port ID and the location of the mount event. In a twenty-fifth step, involving a twenty-fifth message 121o', the operation support system 60 transmits an acknowledgement message to the configuration device 11. Optionally, the twenty-fifth message 121o' might involve a message "please wait for resynchronization", an adaptation process relating to the sync bandwidth on the access node in a twenty-sixth step, involving a processing 121p' by the operation support system 60, and a reconnect processing 121q' (in a twenty-seventh step). In a twenty-eighth step, involving a twenty-eighth message 121r', the operation support system transmits an acknowledgement information to the field service 12. In a twenty-ninth step, involving a twenty-ninth message 121s', the field service 12 transmits an acknowledgement information with the order ID to the Customer Relation Management function 80. In a thirtieth step, involving a thirtieth message 121t', the operation support system 60 transmits an information to the network IDP 65 in order to create a line ID entry. In a thirty-first step, involving a thirty-first message 121u', the network IDP 65 indicates to the control function 40 to create a line ID entry with a "default policy", i.e. with the first functionality level of capabilities of an Internet Protocol connection. In a thirty-second step, involving a thirty-second message 121v', the control function 40 acknowledges the creation of the requested line ID to the network IDP 65. In a thirty-third step, involving a thirty-third message 121w', the network IDP 65 acknowledges the creation of the requested line ID to the operation support system 60. In a thirty-fourth step, involving a thirty-fourth message 121x', the operation support system 60 acknowledges the creation of the requested line ID to the Customer Relation Management function 80.

As a result, the port ID and the line ID are stored in an inventory database, especially in the operation support system 60. The identification of the port ID has occurred fully automatically. Optionally, the configuration of the network port of the access node 20 (especially regarding sync bandwidths and/or transmission bandwidths) can be realized during the described assignment process of the port ID and the line ID. The line ID is known with the network IDP 65 together with the location and a default profile. The control function 40 has received from the network IDP 65 an entry relating to the line ID.

Afterwards the control function 40 sends a re-parameterization request from the control function 40 to the Internet Protocol Edge node 30 resulting in an Internet Protocol connection with the first functionality level.

Optionally, in case that during the mount event no order ID is found, the technician at the configuration device is requested for a transaction number TAN. Then, the operation support system 60 searches for the transaction number TAN whether an order ID is known. In case this is verified, the mount event can proceed. The operation support system corrects the inventory information (especially a changement of the port ID). This error case can occur in case of an erroneous connection of the copper lines or that the technician intentionally uses a different port (than indicated related to the order ID) due to the fact that the indicated port is not operational.

Preferably, the configuration device 11 comprises one or a plurality of cartridges provided for different types of access nodes 20 (e.g. ADSL, VDSL, optical fiber or coaxial cable). Furthermore, the configuration device 11 preferably comprises a human-machine-interface, preferably with a display and/or input means.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for efficient initialization of a telecommunications network, the telecommunications network comprising an access node and an operation support system, the access node providing a plurality of network ports, and a configuration device being connected to one of the network ports, the one of the network ports being specified by a network port identification information, wherein the configuration device is configured to establish an Internet Protocol connectivity and to interact with a user, wherein the method comprises the following steps:

establishing a physical communication channel between the access node of the telecommunications network and the configuration device;

providing, by the telecommunications network, via an Internet Protocol Edge node, a public or private Internet Protocol address to the configuration device, wherein the configuration device is configured to use the provided Internet Protocol address to communicate with the Internet Protocol Edge node of the telecommunications network, wherein the Internet Protocol Edge node is a routing device having a plurality of access and permission rules; and assigning, by the telecommunications network, a configuration and installation functionality level of service permissions to the provided Internet Protocol address;

wherein the provided Internet Protocol address is associated with the network port identification information and an Internet Protocol session (IP session) or connection realizes a logical communication channel initiated between the Internet Protocol Edge node of the telecommunications network and the configuration device, wherein the logical communication channel using the configuration and installation functionality level enables a communication between the configuration device and the operation support system using the physical communication channel between the access node of the telecommunications network and the configuration device;

wherein the method further comprises the steps of:

requesting, by the configuration device, the operation support system via the configuration and installation communication channel to configure the network port; and using a network access related identification information together with the network port identification information to initialize the network port resulting in the logical communication channel with a first functionality level;

wherein the network access related identification information is a line ID information.

2. The method according to claim 1, wherein the telecommunications network comprises a control function, and wherein the network port identification information to enable the configuration and installation functionality level is sent to the control function.

3. The method according to claim 1, wherein the operation support system retrieves the network port identification information related to an IP address from a control function.

4. The method according to claim 1, wherein the telecommunications network comprises a Customer Relation Management function, wherein the Customer Relation Management function requests the initialization of the network port at the operation support system.

5. The method according to claim 1, wherein the method comprises the step of inputting the network access related identification information at the configuration device.

6. The method according to claim 1, wherein the configuration device is an active transfer point device or active APL (access point line) device, and wherein a further configuration and installation communication channel is used between the configuration device and the operation support system, and wherein the method comprises the step of the operation support system requesting the configuration device to send the network access related identification information to the operation support system.

7. A telecommunications network provided for efficient initialization of the telecommunications network, comprising:

a plurality of network nodes;

an access node providing a plurality of network ports;

an operation support system;

a configuration device connected to one of the network ports, the one of the network ports being specified a network port identification information, wherein the configuration device is configured to establish an Internet Protocol connectivity and to interact with a user; and a physical communication channel between the access node of the telecommunications network and the configuration device;

wherein the telecommunications network is configured such that a public or private Internet Protocol address is provided, via an Internet Protocol Edge node, to the configuration device, wherein the Internet Protocol Edge node is a routing device having a plurality of access and permission rules;

wherein the configuration device is configured to use the provided Internet Protocol address to communicate with the access node of the telecommunications network;

wherein the provided Internet Protocol address is associated with the network port identification information and an Internet Protocol session or connection realizing a logical communication channel is initiated between the Internet Protocol Edge node of the telecommunications network and the configuration device; and wherein the logical communication channel using the configuration and installation functionality level of service permissions is configured to enable a communication between the configuration device and the operation support system using the physical communication channel between the access node of the telecommunications network and the configuration device;

wherein the network port is configured by the operation support system on request by the configuration device, and wherein a network access related identification information is used together with the network port identification information to initialized the network port;

wherein the network access related identification information is a line ID information.

8. The telecommunications network according to 7, wherein the configuration device is an active transfer point device or active APL (access point line) device, and wherein a further configuration and installation communication channel is used between the configuration device and the operation support system, wherein the configuration device is requested by the operation support system to send the network access related identification information to the operation support system.

9. A non-transitory computer-readable medium having computer-executable instructions for efficient initialization of a telecommunications network stored thereon, the telecommunications network comprising an access node, and an operation support system, the access node providing a plurality of network ports, and a configuration device being connected to one of the network ports, the one of the network ports being specified by a network port identification information, wherein the configuration device is configured to establish an Internet Protocol connectivity and to interact with a user, the computer-executable instructions, when executed by a processor, causing the following steps to be performed:

establishing a physical communication channel between the access node of the telecommunications network and the configuration device;

providing, by the telecommunications network, via an Internet Protocol Edge node, a public or private Internet Protocol address to the configuration device, wherein the configuration device is configured to use the provided Internet Protocol address to communicate with the Internet Protocol Edge node of the telecommunications network, wherein the Internet Protocol Edge node is a routing device having a plurality of access and permission rules; and assigning, by the telecommunications network, a configuration and installation functionality level of service permissions to the provided Internet Protocol address;

wherein the provided Internet Protocol address is associated with the network port identification information and an Internet Protocol session (IP session) or connection realizes a logical communication channel initiated between the Internet Protocol Edge node of the telecommunications network and the configuration device, wherein the logical communication channel using the configuration and installation functionality level enables a communication between the configuration device and the operation support system using the physical communication channel between the access node of the telecommunications network and the configuration device;

wherein the computer-executable instructions, when executed, further cause the following steps to be performed;

requesting, by the configuration device, the operation support system via the configuration and installation communication channel to configure the network port; and using a network access related identification information together with the network port identification information to initialize the network port resulting in the logical communication channel with a first functionality level;

wherein the network access related identification information is a line ID information.

* * * * *